Figure 1:
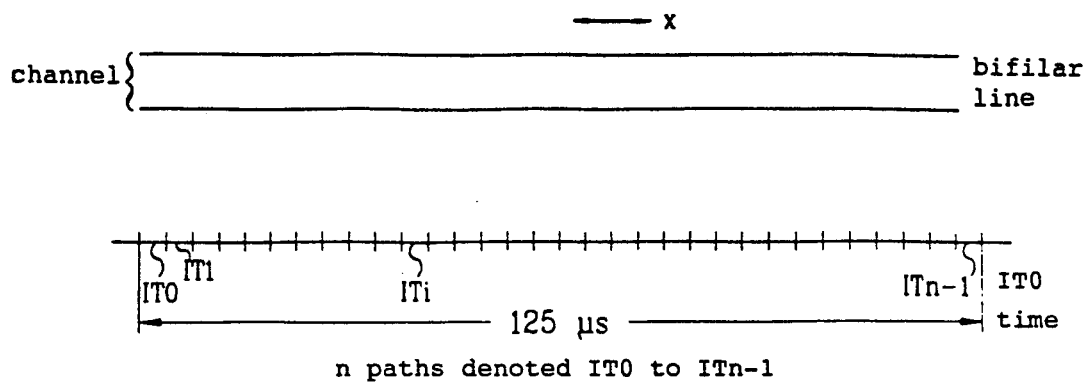

United States Patent [19]
Rebourg et al.

[11] Patent Number: 5,304,990
[45] Date of Patent: Apr. 19, 1994

[54] MODULAR ANALYZER OF DIGITAL SIGNAL TRAFFIC

[75] Inventors: Jean-Claude Rebourg, Rambouillet; Serge JeanClaude, Villeneuve-la-Garenne; Philippe Ezran, Elancourt, all of France

[73] Assignee: France Telecom, Paris, France

[21] Appl. No.: 887,026

[22] Filed: May 22, 1992

[30] Foreign Application Priority Data

May 24, 1991 [FR] France .................. 91 06286

[51] Int. Cl.$^5$ .............. G05B 23/02; H04M 15/00
[52] U.S. Cl. .................. 340/825.06; 340/825.15; 379/112; 379/120; 379/133
[58] Field of Search .......... 340/825.06, 825.1, 825.15, 340/825.11, 825.12, 825.13; 379/34, 111, 112, 113, 114, 120, 133, 134

[56] References Cited

U.S. PATENT DOCUMENTS 4,747,060  5/1988  Sears, III et al. .

FOREIGN PATENT DOCUMENTS 0050917 of 0000 European Pat. Off. .
0213651 of 0000 European Pat. Off. .
2113880 of 0000 United Kingdom .
2129560 of 0000 United Kingdom .
2169476 of 0000 United Kingdom .

OTHER PUBLICATIONS

Law et al, "Real-Time Multi-Channel Monitoring of Communications on a T1 Span", May 9, 1991, 306-309.

*Primary Examiner*—Stephen Chin
*Assistant Examiner*—Duane Kobayashi
*Attorney, Agent, or Firm*—Larson & Taylor

[57] ABSTRACT

A modular traffic analyzer for one or more digital signal multipath transmission channels for the management of digital or analog telephone installations including a module for acquiring and storing samples and a module for processing the latter. A module including at least one dedicated discrimination circuit per signal type travelling over the channel is provided so as to perform, from spectral and power values of the digital signal, a compression of discriminated parameter signal and a distribution according to the signal type or in a temporal mode with respect to one or more channels.

11 Claims, 4 Drawing Sheets n paths denoted IT0 to ITn-1

MODULAR ANALYZER OF DIGITAL SIGNAL TRAFFIC

The invention relates to modular analyzer of traffic for one or more digital signal multipath transmission channels.

The fine analysis of the type and quality of digital signal traffic transmitted over one or more multipath transmission channels is fundamental in regard to engineering and management of the equipment of the corresponding telephone transmission network. Such a type of analysis makes it possible better to dimension the parameters of the transmission equipment such as, for example, the number of paths assigned to a connection, and the need to use special equipment such as CELTIC or ADPCM type concentrators. Such an analysis is also necessary in order to establish rational utilization and rational management of the transmission network, in particular as regards the definition of time slices, for the metering of the traffic, the monitoring of the use of the dedicated lines and the detecting of faulty or unused paths.

Recent work has been undertaken in order to implement such types of equipment. The latter are always complex and, in most cases, permit only rudimentary, or at the very least incomplete statistical analysis of the traffic conditions. Among this equipment may be mentioned that described by the French patent application published under the number 2 643 523. It will however be noted that the equipment described in this document implements a filtering system with adaptive linear prediction, with a view to producing a string of coefficients predicting the nature of the transmitted signal, making it possible, when obtaining a series of steady prediction coefficients, to perform a discrimination of the corresponding nature of this transmitted signal.

Such an operational mode involves sizeable computational power since the string of coefficients must be computed with each sample, so as to ensure suitable convergence of the adaptive filter within a suitable processing duration, at any event compatible with real-time usage. Thus, the device implemented in the above-mentioned equipment includes no less than 13 microprocessors, for a nevertheless less than full analysis capacity, since this type of equipment permits neither the recognition of faulty paths, characterized by repetitive digital sequences, nor 64 Kb/s, nor the detection of lines for which the noise exceeds the detection threshold, that is to say, lines regarded as in speech phase. Furthermore, this type of equipment, at the limit of its processing capacity, can, at best, only presume to ensure the above-mentioned analysis for 30 bidirectional paths, without the possibility of an upgrade, the absence of a procedure for compressing the analysis results only permitting, at best, an overall observation time of 19 hours, in the case where the results are grouped in one-minute slices and where the memory capacity is 1.44 Mbytes.

The aim of the present invention is to implement a traffic analyzing system for one or more digital signal multipath transmission channels, not having the limitations of the prior art.

Another object of the present invention is aimed at implementing a traffic analyzing system for one or more digital signal multipath transmission channels, which is notably simplified in its architecture in relation to comparable systems of the prior art.

Another object of the present invention is the implementation of a traffic analyzing system for one or more digital signal multipath transmission channels making it possible to discern the signal types such as, silence, noise, fixed digital sequence, signalling, callback, speech, 2 100 Hz fixed frequency, modem with through put less than, equal to or greater than 4 800 b/s, 64 Kb/s data transmission, and to determine the direction(s) of transmission, in particular in the case of full-duplex transmission.

Another object of the present invention is also a traffic analyzing system for one or more numerical signal transmission channels which is able to function in time-sharing mode on several PCM-type or similar multiplexors.

The traffic analyzing system for one or more digital signal multipath transmission channels which is the subject of the present invention, these signals being composed of successive digital samples, is notable in that it comprises a module for acquiring and storing these samples, coupled to the transmission channel, and a module for processing the stored samples, including at least one dedicated discrimination circuit per signal type travelling over the transmission channel and delivering discriminated parameter signals as a function of this signal type. A module for compressing these discriminated parameter signals makes possible, for a set of the latter, their distribution as a function of the signal type or of a temporal mode of analysis of the paths constituting the transmission channel, in respect of one or more channels, as results signals.

The system which is the subject of the invention can be used for monitoring digital telephone transmission networks, such as an integrated services digital network, or the analog telephone network, at local analog/digital conversion level.

Figure 3:
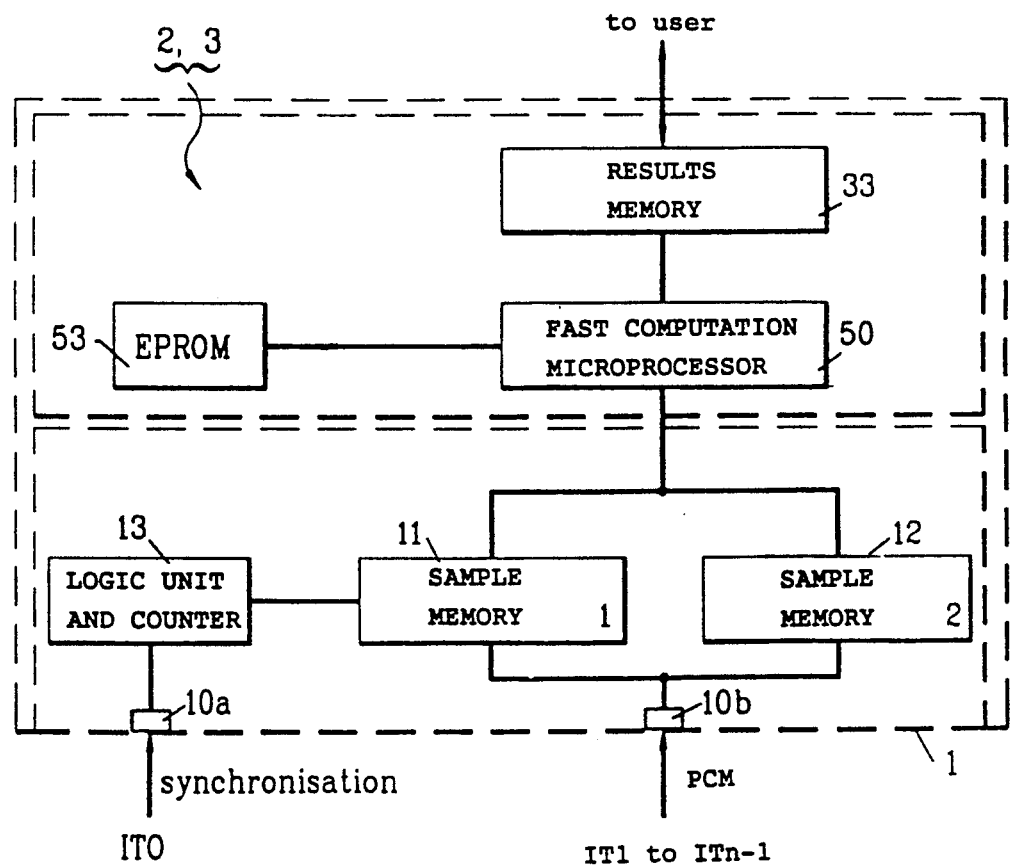
Figure 2A:
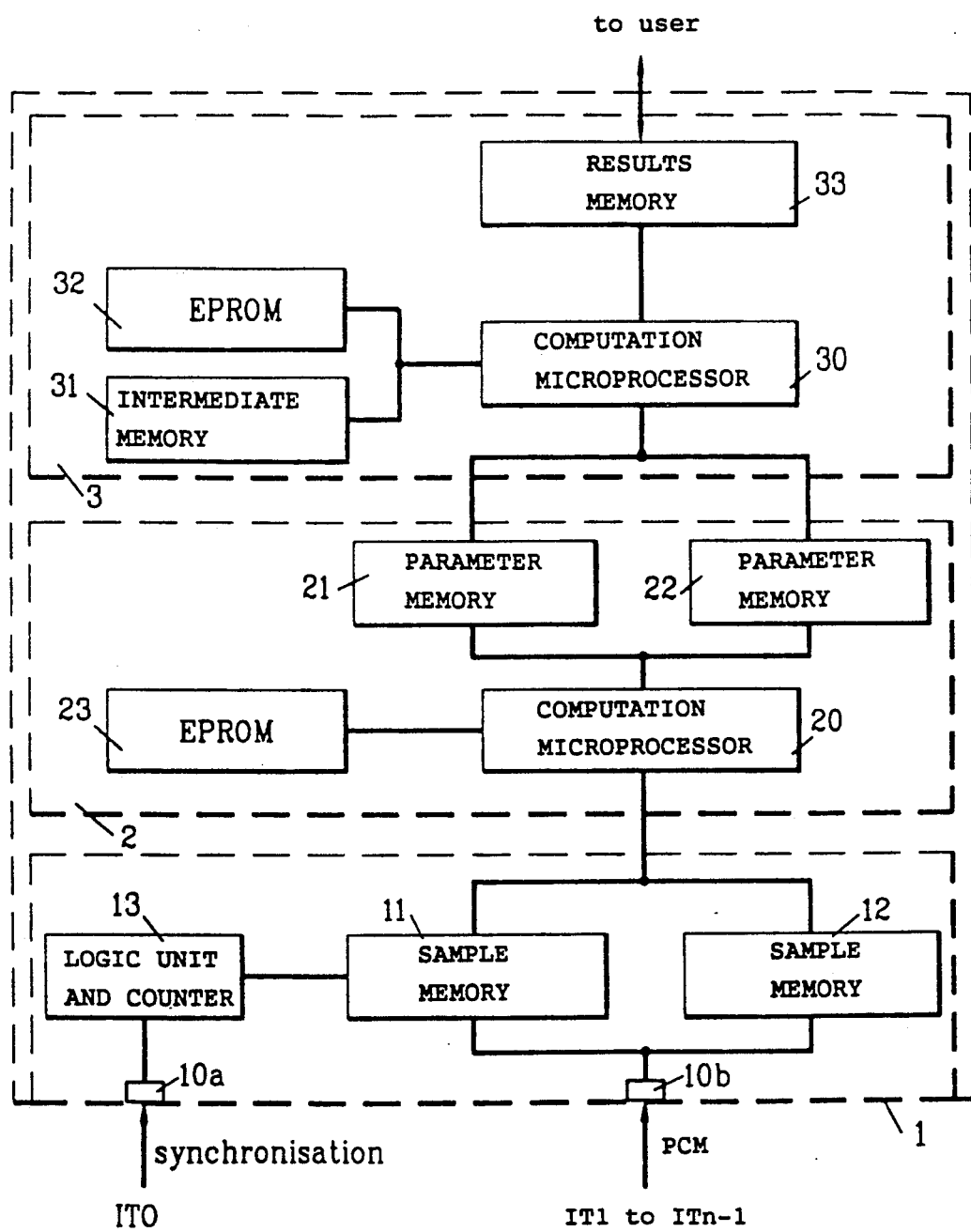
Figure 2B:
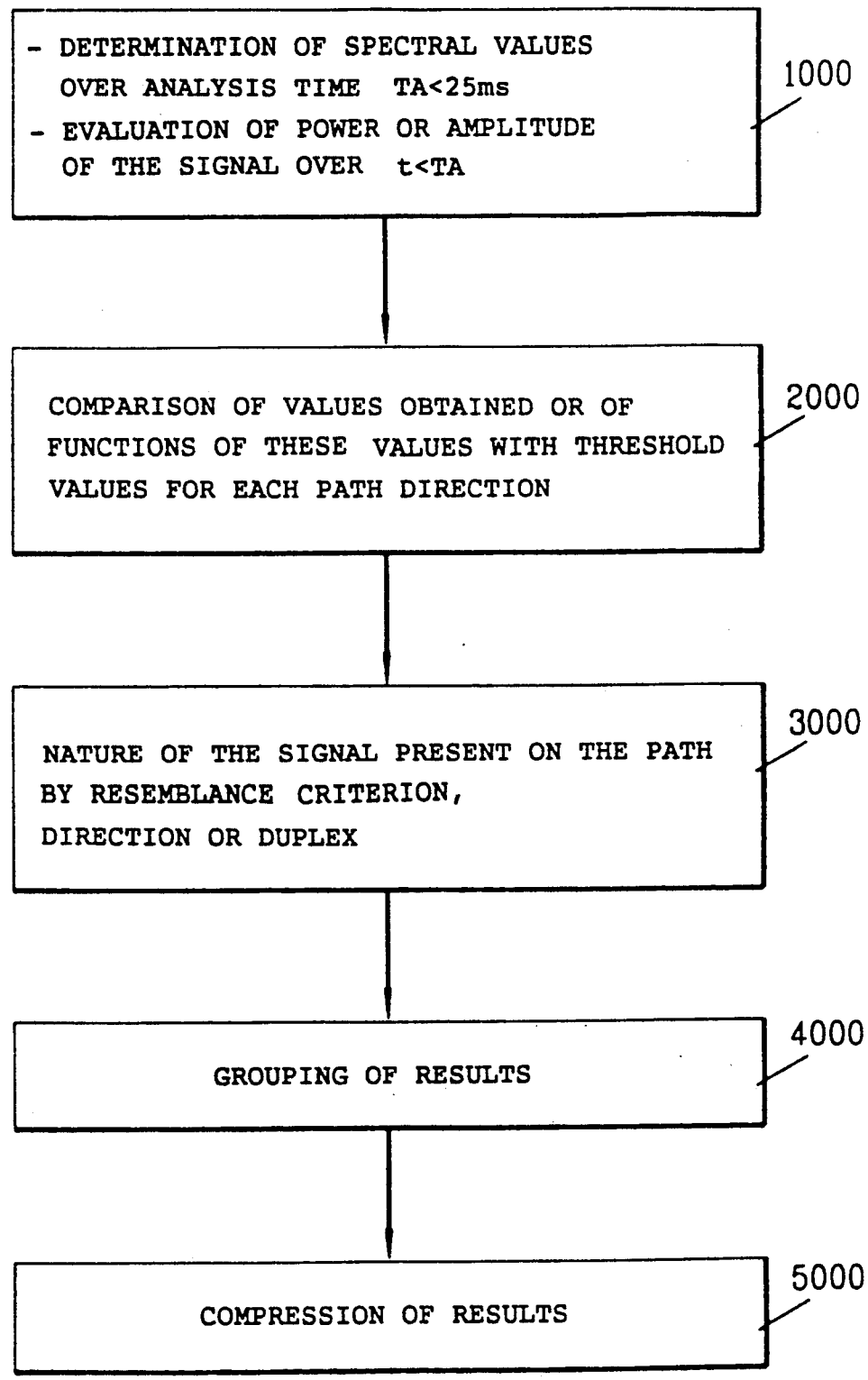
Figure 2C:
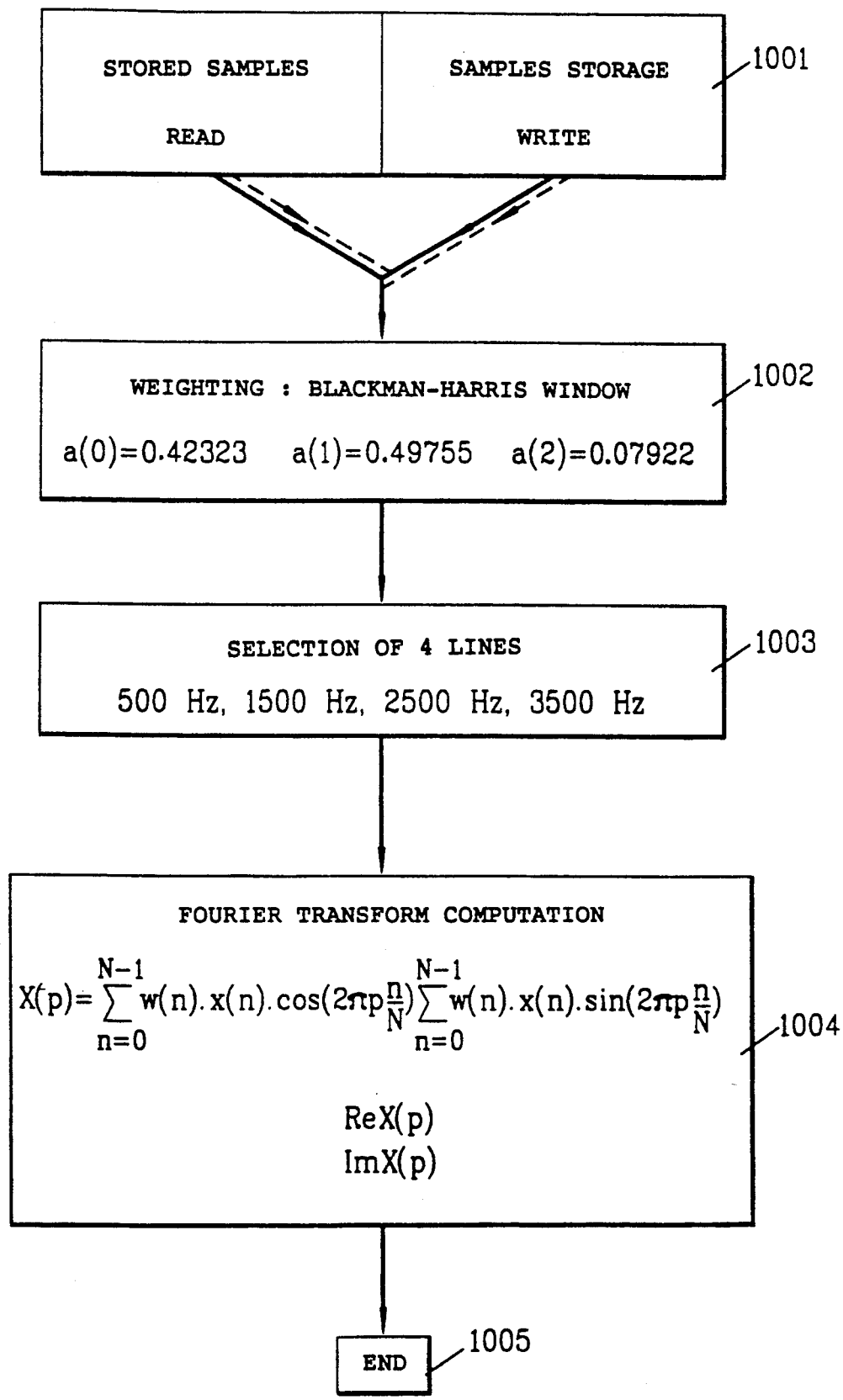

A more detailed description of the system which is the subject of the invention will be given hereinafter in relation to the drawings in which, FIG. 1, relating to the prior art, is given by way of a remainder of the composition of one or more digital signal transmission channels and of the corresponding transmission paths, FIG. 2a represents, by way of non-limiting example, a first embodiment of the traffic analyzing system for one or more digital signal multipath transmission channels, FIG. 2b represents a general flow diagram of the operating procedure of the traffic analyzing system as represented in FIG. 2a, FIG. 2c represents the breakdown of a procedure for computing and determining the spectral values of the analyzed signal over a given analysis time specially matched to the embodiment of FIGS. 2a and 2b, FIG. 3 represents, by way of non-limiting example, a second embodiment of the traffic analyzing system for one or more digital signal multipath transmission channels.

Prior to the description proper of the digital signal traffic analyzer which is the subject of the present invention, a reminder about the form and nature of telephone signals, in particular in digital telephony, will be given hereinafter.

Initially designed to route the speech signal by means of analog or digital signals, the telephone network currently has the objective of transmitting, in addition, other signals such as digital data or signalling frequencies having a well-determined objective. However, the network can be the seat of parasitic noise, and corresponding parasitic signals may disturb normal transmission of the useful signals. Furthermore, in the case of digital signal transmission, the existence must be mentioned of irrelevant specific signals transmitted at a throughput of 64 Kb/s.

With reference to FIG. 1, relating to the prior art, it will be recalled that, generally a channel is composed of a telephone line, for example of bifilar type, affording the connection between one or more subscribers, the transmission of digital signals being performed in respect of the channel as represented in FIG. 1 over a plurality of paths defined by time intervals denoted: IT0, IT1 . . . ITi, . . . ITn−1. By way of non-limiting example, a conventional transmission channel thus includes 32 paths, periodically opened, numbered from 0 to 31 successively.

The period of opening of each path is generally equal to 125 microseconds, each path being opened successively for the transmission of data or of corresponding signals. It will be noted in particular that the path denoted ITO corresponds to a synchronizing signal, which signal comprises a specific pattern, which will not be described in the description.

As far as the main signals are concerned, which are transmitted by the set of above-mentioned paths, over one channel for example, it will be recalled that speech is characterised by periods of activity having large power variations, close to 40 dB, these variations being separated by periods of silence. However, for time intervals less than 25 ms, the corresponding signal can be regarded as having a constant spectrum. Under these conditions, it will be possible to keep an elementary analysis time TA having a value of this order, in order to perform the distinction speech signal/other signal.

The data, or digital sequences of "0" and "1" binary values are transmitted by way of carriers modulated in amplitude, in phase or in frequency or directly at a throughput of 64 Kb/s. For relatively low throughputs, less than or equal to 4 800 b/s, simple modulation is used. In the case of higher throughputs, the phase and amplitude modulation are combined. Modulators-demodulators, affording modulation on transmission and demodulation on reception, transform the digital signal into a signal transmissible over a telephone path whose passband lies between 300–3400 Hz.

The signal for disabling the echo cancellers is a continuous signal with frequency 2100 Hz. This signal must precede the transmissions of data so that the latter are not disturbed.

The line signalling signals- are fixed-frequency signals. Codes 4 and 5 use the 2040–2400 Hz and 2400–2600 Hz frequencies respectively. These signals are exchanged at the start and end of communication. When signalling with the R2 code, used in Europe, line signalling is transmitted separately.

The register signals which correspond to the dialing are generally transmitted in code form using two out of several frequencies which are transmitted simultaneously. Code 5 involves 6 frequencies separated by 200 Hz, from 700 to 1700 Hz. Code R2 involves 2 series of 6 frequencies, the first between 540 and 1140 Hz, the second between 1380 and 1980 Hz. In code 4, the frequencies used are the same as the line signalling frequencies.

The fixed signals known by the English name "Pattern Fix" are repetitive line signals which may indicate operating anomalies or faulty lines.

The noise signals are parasitic signals whose energy level exceeds the threshold for activity detection and which are found on disturbed lines.

The traffic analyzing system for one or more digital signal multi path transmission channels which is the subject of the present invention will now be described in connection with FIG. 2a.

In a particularly advantageous manner, the analyzing system represented in the above-mentioned figure advantageously includes a module 1 for acquiring and storing samples, these samples being composed of successive digital samples representative of the signals previously mentioned in the description. The acquisition module 1 is coupled to the transmission channel by way of a matched sensor, not shown in the drawing, this sensor making it possible to perform a discrimination between the synchronising signals transmitted by the first path, denoted ITO in FIG. 1, and the other paths, denoted IT1 to ITn−1. The type of sensor used can usually be any type available on the market and in particular the circuits marketed by the SIEMENS company under the ACFA-PLCC44 or IPAT-PLCC28 reference. It will be noted that this type of sensor makes it possible essentially to perform a serial-parallel transformation with the digital signals conveyed by the paths of the above-mentioned channels.

Furthermore, as represented in this same FIG. 2a, the analyzing system of the invention comprises a module 2 for processing the stored samples, this module delivering discriminated parameter signals as a function of the signal types.

Furthermore, a module 3 for compressing the discriminated parameter signals, including at least one dedicated discrimination circuit per signal type travelling the transmission channel makes possible, for a set of these latter, their distribution as a function of the type of signal or of a temporal mode of analysis of the paths composing the transmission channel, for one or more channels, as results signals.

Thus as has furthermore been represented in FIG. 2a, the acquisition and storage module 1 advantageously includes a first and a second sample memory circuit, denoted 11 and 12 respectively, these memory circuits being coupled to the channels of the transmission path by way of input ports denoted 10a and 10b in FIG. 2a, and of course of the previously mentioned sensor, not shown.

In a particularly advantageous manner, the first and second sample memory circuits 11, 12, operate alternately on writing, respectively on reading, for a specified duration equal to a sample analysis time TA.

A general manner, it will be noted that in the above-mentioned sample memories 11 and 12, digital values proportional to the amplitude of the samples of the analyzed signal are introduced in the course of operation. The processing of an analog signal requires an analog-digital conversion. In the case of the analysis of a sample train delivered by a PCM type coder, the samples coded over 8 bits, according to recommendation G732 of the CCITT, must be linearised over 13 bits. Such a transformation can be performed prior to the storing of the samples. It may also be done by the signal processing device, that is to say, in the previously mentioned processing module 2, by consulting a corresponding table of values. In the latter case, the samples are stored directly in the form of 8-bit words. Thus, the sample memories 11 and 12 function in alternately, with the processing module 2 reading and processing the values stored in one of the memories i.e., stored during the course of the immediately preceding analysis time. during the recording of the sample values in the other memory.

As has furthermore been represented in FIG. 2a, the processing module 2 includes a computation circuit 20 and auxiliary storage circuit 21, 22 making possible, through reading the samples stored in one of the first or second memory circuits 11, 12, mentioned previously, the storing of parameters making possible the computation, by the computation circuit 30, of the spectral and power or average amplitude values of these samples, as well as the discrimination of these values by comparing these values or functions of them with threshold values.

It will be noted in a particularly advantageous manner that the comparing and, finally, the discriminating of the analyzed signals is performed for each direction of propagation of the latter over the relevant channel in order to compose the discriminated parameter signals.

It will thus be understood that the analysis of the values representative of the signals is composed of a procedure for computing parameters serving in the discriminating of the spectral values over the analysis time TA and the evaluating of averages of these signals over shorter times. These parameters make it possible to measure the variations in the power of the signal.

Thus, as can be noted on looking at FIG. 2a, the auxiliary storage circuits include a first and a second auxiliary storage circuit, denoted 21 and 22, operating in a manner similar to the sample memory circuit 11, 12, alternately on writing, respectively while reading.

Generally, it will be understood that in order to obtain reliable results, the parameters used must be steady for the elementary duration of analysis. The characteristics of the speech signal then lead to choosing an analysis time TA less than 25 ms.

Thus, as represented in FIG. 2a, a circuit of EPROM read-only memory type, denoted 23, in which the program for computing the parameters or a portion of the latter is stored permanently, is also associated with the computation circuit 20.

Furthermore, as has also been represented in FIG. 2a, the module 3 for compressing the discriminated parameter signals includes, advantageously, a computation circuit 30 making it possible to ensure the processing of the discriminated parameter signals stored in one of the first or second 21, 22, auxiliary storage circuits in order to produce the results signals. It will be noted that, advantageously, the compression module 3 can include, for example, an intermediate memory 31 consisting of a RAM-type random-access memory intended to ensure the role of a work memory for the computation circuit 30.

The compression module 3 also includes an EPROM-type read-only memory, denoted 32, which includes the program for discrimination computation, for compression, and for formatting the results signals, as will be described hereinafter in the description. Of course, the results signals are then stored at the level of a circuit 33 for storing these signals.

It will be noted that, advantageously, a distribution of the tasks of computing the discrimination parameters and of the discriminating proper can be effected between the computation circuit 20 of the processing module 2 and the computation circuit 30 of the compression circuit.

A more detailed description of a particularly advantageous computation procedure implemented by means of the analysis system as described in connection with FIG. 2a will now be given in relation to FIGS. 2b and 2c.

As has been represented in FIG. 2b, the circuits for computation 20 and 30 and for auxiliary storage, and in particular the read-only memories 23 and 32 include subroutines making it possible to effect successively a determination, denoted 1000, of the spectral values of the analyzed signal over a specified analysis time TA and an evaluation of the power or of the amplitude of the analyzed signal, and then a comparison 2000 of the spectral and power values or of a function of these values with threshold values for each direction of propagation of each path of the transmission channel. A discrimination, denoted 3000, of the nature of the signal present on the path through a resemblance criterion is next performed following the previously mentioned comparison at 2000. It will be noted that, advantageously, the discrimination by resemblance criterion can be performed following the above-mentioned comparison by taking into account ranges of decision values corresponding, for example, to fuzzy logic based on specified criteria. Finally, a grouping procedure is performed at 4000, this grouping procedure making possible a grouping of the analysis results by selection according to a specified heuristic. The grouping procedure is followed by a results compression procedure at 5000.

Generally, it will be noted that the first steps carried out by the subroutines corresponding to reference 1000 may advantageously be carried out by the computation circuit 20, whereas the end of step 1000 and steps 2000, 3000, 4000 and 5000 can on the contrary be carried out by the computation circuit 30, for example. It will be certainly be understood that the computation circuits 20 and 30 can be embodied with fast computational processors such as, for example, the circuit marketed by the TEXAS INSTRUMENTS Company under the TMS 32010 reference, fitted with their program memory. The execution of the procedures indicated in FIG. 2b is not limiting, a judicious arrangement of the various computational procedures possibly being carried out as a function of the capabilities of the two above-mentioned computation circuits.

According to a particularly advantageous embodiment of the subroutine 1000 making it possible to analyze the spectral values of the analyzed signal, the latter can comprise, as represented in FIG. 2c, a routine 1001 for alternated calling of the sample values stored at the level of the sample memories 11 and 12 described previously, a routine 1002 for spatial-temporal weighting of these samples on the basis of a Blackman-Harris type weighting window. In the case of the use of the above mentioned weighting window, the coefficients a(0), a(1) and a(2) are chosen with the values below:

$a(0) = 0.42323$
$a(1) = 0.49755$
$a(2) = 0.07922$.

Following the above-mentioned steps, a routine 1003 is provided, which makes possible a selection of 4 preferential spectral lines uniformly distributed within the frequency band of the analyzed signal, the lines at 500, 1500, 2500 and 3500 Hz, for example. This selection of the lines can be performed by choosing or initializing corresponding parameters, parameters $p = N/16$, $3N/16$, $5N/16$, $7N/16$ for a number N of samples = 32.

The routine for selecting the 4 above mentioned lines is then followed by a routine 1004 for computing the FOURIER transform:

$$X(p) = \sum_{n=0}^{N-1} w(n) \cdot x(n) \cdot \cos\left(2\pi p \frac{n}{N}\right) - i \sum_{n=0}^{N-1} w(n) \cdot x(n) \cdot \sin\left(2\pi p \frac{n}{N}\right).$$

This relationship is then computed for corresponding values of the above mentioned parameter p, namely the values representative of the preferential spectral lines mentioned previously.

In the previously cited relationship, w(n) satisfies the expression:

$$w(n) = a(0) - a(1)\cdot\cos 2\pi n/32 + a(2)\cdot\cos 4\pi n/32.$$

In the above mentioned relationship, N=32 and $0 \leq n \leq N-1$.

Step 1005 corresponds to an end-of-computation step.

It will be understood that, generally, steps 1001, 1002, 1003, as well as part of step 1004, can be performed at the level of the computation circuit 20, whereas the end of step 1004 and step 1005 can on the contrary be performed at the level of the computation circuit 30 for example.

Indications will be given on the previously mentioned procedure for computing the Fourier transform.

Generally, computation of the Fourier transform is performed on four successive packets of 32 samples, N=32, weighted by the previously mentioned Blackman-Harris window with three coefficients. The parameters w(n) are obtained through the relationship mentioned previously in the description.

The Fourier transform over N, with N=32, is then performed by computing the X(p) for the values of p previously mentioned in the description, and which correspond to the four preferential spectral lines previously mentioned.

Since the signals are real, the spectrum has hermitian symmetry and hence there is an overlapping of the frequency band from 0 to 8000 Hz. Taking into account the fact that only four preferential lines are computed, it is judicious to not use a fast Fourier transform. On the contrary, it is advantageous to group samples which have like absolute value of cosine and sine.

The computation can then be performed taking into account the fact that cos(2p+1).x is a function of cosx, and that sin(2p+1).x is a function of sinx. A knowledge of cos(nπ/8) is sufficient to find all the cosine values, and vice versa, concerning the value of sin(nπ/8) to find all the sine values required in the computation.

A change of variable
$$u(n) = w(n).\sup(|\cos(n\pi/8)|, |\sin(n\pi/8)|)$$

then makes it possible to compute, as a function of the value of n belonging to [0, n−1]. the values w(n), u(n) respectively.

A computation of intermediate sums grouping the values of n corresponding to like absolute values of cosine and of sine is then performed, and then a computation of the Fourier transform proper is performed by computing the real part Re(X(p)), imaginary part −Im(X(p)) respectively, from the previously mentioned intermediate sums.

It will be noted that in a particularly advantageous manner, in the device described in FIG. 2a, the first computation circuit computes eight values of intermediate sums under the conditions mentioned previously, and the second processor 30 then makes it possible to compute the real and imaginary parts of the corresponding spectral values.

A more detailed description of the mode of grouping the results will now be described hereinafter.

It will be noted that the total observation time depends on the capacity for storing available results and on the elementary time TE chosen by the user as a function of the accuracy of observation desired. This elementary time TE will advantageously be taken equal to a multiple of the analysis time TA. During the elementary time TE, the results are grouped according to the analysis type chosen in order to be stored to the output memory or result memory, the memory 33 in FIG. 2a. Of course, the result memory 33 is connected to an output port with which may be interconnected a workstation from which the user can work. Thus, the grouping of the results can be performed by the processor 30 by means of a grouping subroutine including, over an elementary observation time TE chosen by the, user, a routine for analysis by majority type of traffic over the relevant elementary time. In this type of utilization, that is to say, grouping of the results, the traffic adopted for each path is that which was observed in majority fashion during the relevant time. The analysis system previously described in relation to FIG. 2a making it possible to distinguish 15 signal types per path, the traffic from each path can thus be characterized over one half-byte. The 30 paths of a PCM-type concentrator can then be coded over 15 bytes. Thus, on a 1.44 Mbytes storage disk, it will be possible to record 96 000 elementary times TE of 16 ms corresponding to 25 minutes of monitoring or analysis of the traffic and more than 2 hours for an elementary time TE of 80 ms.

Furthermore, the grouping subroutine comprises a routine for path by path quantitative analysis of the traffic. The type of traffic, that is to say, the nature of the signals, is then determined for each path, according to the previously described discrimination criteria, and totalled in a corresponding accounting subroutine. After a specified elementary time TE, for example, taken equal to one minute, the contents of the 15 counters of each of the 30 paths is transmitted into a result memory, each elementary counter consisting of the corresponding subroutine being reset to 0 for a new elementary time. Such an analysis does not give the order in which each signal type was detected, but merely the number of times it was discriminated during the above mentioned time TE. The word corresponding to each signal type can then be composed of a half-byte characteristic of the type and, in order to indicate the number of times it has been encountered, a second half-byte is then required for an elementary time of 400 ms for example. For higher times, for example one minute, the counting part is coded over 12 bits. It is however very rare for the 15 signal types to be discriminated in respect of a given path during an elementary time TE. Accordingly, a certain number of words have their counting value part equal to 0 at the end of the elementary time. In such a case, only the words having a relevant counting content are retained. So as to locate, in the file consisting of the value of the stored words, the end of the information corresponding to the elementary time analyzed, the last word has its counting part, namely the 12 final bits, set to the value 0, its real value being deducible from the other values relating to the same elementary time TE. Thus, the minimum duration of recording which corresponds to the case where, on all paths, the 15 signal types are found simultaneously during each elementary time TE, is equal, for a 1.44 Mbyte recording disk for 30 paths, 2 bytes being allocated to each counting word and for 15 signals, for an elementary TE of 1 minute, to substantially 26 hours. On the contrary, if a single signal type is encountered and discriminated per elementary time for each of the paths, the same memory recording capacity makes it possible to record a time 15 times longer, namely 2 weeks. In practice, it being possible to adopt the average of signal types per above mentioned elementary time, a recording duration of 1 week can be envisaged.

Furthermore, the grouping subroutine includes a routine for overall quantitative analysis of the type of traffic. In this case, a counting subroutine is assigned to each of the discriminated signal types. Of course, for this purpose it is necessary for there to be no confusion between the various signal types. Thus, 15 counting subroutines are organised for the set of 30 paths, each counting subroutine corresponding to one signal type. Each subroutine is then incremented when this signal is encountered on one of the paths, and an overall result is therefore obtained without being able to get back to a particular path.

Thus, for an elementary time TE of 16 ms, the duration of recording, according to an overall quantitative analysis, in the case in which all the signals are detected, is about, on a 1.44 Mbyte storage medium for the 15 signals to which 0.5 bytes of 192 000 elementary times TE are assigned, 50 minutes. For an elementary time TE of 1 minute, requiring counting routines containing words of 2 bytes, this duration is 800 hours.

Finally, according to an advantageous aspect of the system which is the subject of the present invention, the subroutine for grouping the results furthermore includes a routine for path by path chronological analysis of the transmitted signals. In this case, a discrimination-counting subroutine is associated with each of the paths, making it possible to total the number of times each signal has been detected during the elementary observation time TE. In this case, with each new signal encountered within an elementary analysis time, a new word is used. The first four bits make it possible to indicate the type of the signal and the 4 or 12 following bits serve to total the number of times it has been found. Just as in the case of overall quantitative analysis, the last word of each path serves as separator, its counting value part being set to the value 0. The recording time in the case of 4 words of 1 byte on a 1.44 Mbyte medium for 4 bytes for 30 paths is 12 000 elementary times TE for an elementary time of 12 seconds, namely 40 hours. The maximum recording time is 160 hours for a single word transmitted per elementary time TE.

It will be pointed out however that in the case of a speech signal, it is not however possible to envisage changing the counting word with each silence. Two counting routines are then used, the speech signals are totalled in the first and the speech silences, whose duration is limited to a predetermined value, in the second. A silence of a duration greater than this value will not be regarded as a speech silence.

It will be noted that the grouping subroutine can advantageously be implemented on the basis of the readonly memory 32 and the computation circuit 30, the corresponding results in the form of counting words being stored at the level of the result memory 33, which can then be utilised via the user's workstation.

The architecture of the analyzing system represented in FIG. 2a is advantageous since it makes possible, by reason of the interconnection of the computation microprocessors 20 and 30 by way of auxiliary storage circuits 21 and 22, also operating alternately, great flexibility of use and of distribution of the respective tasks.

As regards the results, stored in the result memory 33, it is indicated, according to an advantageous embodiment, that these are given in the form of 16-bit words.

The 4 most significant bits give the type of the signal according to the list below:
1 silence
2 2100 Hz S1
3 2100 Hz S2
4 Speech
5 4800 bits/s S1
6 9600 bits/s S1
7 4800 bits/s S2
8 9600 bits/s S2
9 4800 bits/s S1 and S2
10 9600 bits/s S1 and S2
11 noise S1
12 noise S2
13 signalling
14 pattern fix or call-back S1
15 pattern fix or call-back S2.

With each elementary time TE, the corresponding words found on each of the paths are transferred into the result memory 33, which was firstly initialised to 0. So as to reduce the number of words to be stored, only the words having a counting part different from 0 are retained, the last word of each path having its counter part set to 0, before transfer to the result memory 33 and thus serving as separator. Its content is however easily deduced from the content of the others by complement to a total number dependent on the commands given to the processor 30. In the path by path chronological mode of analysis, the maximum number of words retained per path is 16. In this case, the last word is set to the value FFFF in hexadecimal code.

Of course, the analyzing system which is the subject of the present invention is not limited to the embodiment as represented in FIG. 2a. In particular, and through the use of a more powerful computation circuit, on the one hand, and developments of the procedure for computing the Fourier transform, on the other hand, the effective computation time can be diminished, which makes it possible, advantageously, to use only a single computation circuit.

As represented in FIG. 3, in this case, the processing module 2 and the compression module 3 comprise 1 single computation circuit denoted 50, this computation circuit consisting of a microprocessor. In this case, this microprocessor is interconnected directly with the first and second sample memories 11 and 12, as represented in FIG. 3. The computation processor 50 can then be embodied by a TMS 320C25 signal processing processor marketed by the TEXAS INSTRUMENTS company.

As regards the developments of the computation of the Fourier transform, it will simply be indicated that the read-only memory 53 associated with the computation circuit 50 then includes a routine for spatial-temporal weighting of the samples, according to a Kaiser-Bessel window. In this case, the weighting parameter α is taken equal to α=43.7. The thresholds for comparison of the spectral values are then matched accordingly.

Furthermore, computation of the power of the signal is performed by means of a routine in which this calculation is performed by summing the squares of the sample values. Computation of the Fourier transform for n samples can be performed on as large a number of samples as possible, for example 128. An analysis time TA of 16 ms can then be retained. The use of the Kaiser-Bessel window under the above-mentioned conditions makes it possible to obtain preferential spectral lines similar to those obtained in the first embodiment. It is then observed that, for n, n representing the sample sequence number such that n ε [42, 86], the coefficients are sufficiently small to be neglected, this of course simplifying the computations.

A particularly powerful digital analysis traffic analysis system has thus been described. Indeed, the analyzing system previously described makes it possible, by comparing parameters of spectral values or a function of these values with specified threshold values, to identify the nature of the signal with a probability of error less than 1% per analysis time of 16 ms.

We claim:

1. A traffic-analyzing system for one or more digital signal multipath transmission channels comprising a plurality of paths, said signals consisting of successive digital samples, said system comprising:

means, coupled to at least one transmission channel comprising a plurality of paths, for acquiring and storing said samples, and for discriminating between synchronizing signals transmitted over one path and other signals transmitted over other paths, said samples being stored as stored samples of a signal to be analyzed, and said acquiring and discriminating being performed over an analysis time period TA during which parameters of said signals are substantially steady;

means for processing said stored samples, said processing means including at least one dedicated discrimination circuit per signal type travelling over said at least one transmission channel for delivering, as a function of the signal type travelling over said at least one channel, discriminated parameter signal; and means for compressing said discriminated parameter signals and for thus permitting, for a set of said parameters signals over an elementary time period TE which is a multiple of said analysis time period TA, the distribution of said parameter signals, as a function of the signal type or of a temporal mode of analysis of said paths comprising the transmission channel, with respect to at least one channel, as resultant signals, thereby allowing said traffic analyzing system to operate in real time mode.

2. A system as claimed in claim 1, wherein said means for acquiring and storing said stored samples includes: first and second sample memory circuits which are coupled to the paths of said at least one channel, the first and second sample memory circuits operating alternately to enable writing and reading, respectively, for a specified duration equal to an analysis time for said samples.

3. A system as claimed in claim 2, wherein the processing means includes auxiliary storage and computation means for enabling, through reading samples stored in one of the first or second sample memory circuits, during a preceding analysis time period, the performing of computation and storage of the spectral values and power or average amplitude values of these stored samples and the discrimination of these values by comparing these values or functions thereof with threshold values, for each direction of propagation of the signals over the corresponding channel, in order to compose said discriminated parameter signals.

4. A system as claimed in claim 3, wherein said auxiliary storage means includes first and second auxiliary storage circuits operating alternately to enable writing and reading, respectively.

5. A system as claimed in claim 4, wherein the means for compressing said discriminated parameter signals includes:

computation means for providing processing of said discriminated parameter signals stored in one of the first and second auxiliary storage circuits, in order to produce the resultant signals, and means for storing the resultant signals.

6. A system as claimed in claim 3, wherein the computation and auxiliary storage means include a program comprising corresponding subroutines enabling performing in succession of:

a determination of the spectral value of the analyzed signal over a specified analysis time TA, and an evaluation of the power or the amplitude values of the analyzed signal, a comparison of the spectral values, and of power or of functions of these values, with threshold values, for each direction of propagation of each path of the transmission channel or of the transmission channels, a discrimination of the type of the signal present on each path by a resemblance criterion, following said comparison.

a grouping of the computational results by selection according to a specified heuristic procedure, and a compression of the computational results.

7. A system as claimed in claim 6, wherein the subroutines include:

a routine for alternate calling of the stored sample as sample memory level, a routine for the spatial-temporal weighting of these stored samples on the basis of a Blackman-Harris type weighting window, with specified coefficients a(0), a(1), a(2), a routine for selecting four preferential spectral lines uniformly distributed within the frequency band of the analyzed signal, a routine for computing a Fourier transform according to the relation:

$$X_p = \sum_{n=0}^{N-1} w(n) \cdot x(n) \cdot \cos\left(2\pi p \frac{n}{N}\right) - i \sum_{n=0}^{N-1} w(n) \cdot x(n) \cdot \sin\left(2\pi p \frac{n}{N}\right)$$

for values of p=N/16, 3N/16, 5N/16 and 7N/16 representative of the above-mentioned preferential spectral lines, where w(n) satisfies the expression $w(n) = a(0) - a(1).\cos 2\pi n/32 = a(2).\cos 4\pi n/32$, $0 \leq n \leq N-1$ and $N=32$.

8. A system as claimed in claim 6 wherein subroutine for providing said grouping of the computational results includes, for grouping over an elementary observation time chosen by the user:
   a routine for analysis by majority type of traffic, over said chosen elementary observation time,
   a routine for path by path quantitative analysis of the traffic, the traffic type, and nature of the signals, being determined for each path and totalled in a corresponding accounting subroutine,
   a routine for overall quantitative analysis of the traffic type, one counting subroutine being assigned to each of the discriminated signal types, and
   a routine for path by path chronological analysis, one discrimination-counting subroutine being associated with each of the paths, thereby enabling totaling of the number of times each signal has been detected during said chosen elementary observation time.

9. A system as claimed in claim 5, wherein said processing means and said computation means of the compression means each include computational microprocessor, said computational microprocessor being interconnected by way of said first and second alternately operating auxiliary storage circuits.

10. A system as claimed in claim 2, wherein the processing means and compression means comprise a computational microprocessor directly interconnected with said first and second sample memories.

11. A system as claimed in claim 10, wherein said microprocessor includes:
   a routine for spatial-temporal weighting of the samples according to a KAISER-BESSEL window, using a weighting parameter $\alpha$ taken equal to $\alpha = 43.7$, and the comparison thresholds for the spectral values being matched accordingly, and
   a routine for computing the power of the analyzed signal by summing the squares of the sample values.

* * * * *